United States Patent [19]

Shimizu

[11] Patent Number: 4,715,463

[45] Date of Patent: Dec. 29, 1987

[54] ELECTRIC POWER STEERING SYSTEM FOR VEHICLES

[75] Inventor: Yasuo Shimizu, Saitama, Japan

[73] Assignee: Honda Giken Kogyo Kabushiki Kaisha, Tokyo, Japan

[21] Appl. No.: 10,665

[22] Filed: Feb. 4, 1987

[30] Foreign Application Priority Data

Feb. 6, 1986 [JP] Japan .................. 61-25165

[51] Int. Cl.$^4$ ............................................. B62D 5/04
[52] U.S. Cl. ........................... 180/79.1; 180/142
[58] Field of Search .............. 180/142, 141, 143, 79.1

[56] References Cited

U.S. PATENT DOCUMENTS

| | | | |
|---|---|---|---|
| 4,624,334 | 11/1986 | Kelledes et al. | 180/79.1 |
| 4,651,840 | 3/1987 | Shimizu et al. | 180/79.1 |
| 4,657,103 | 4/1987 | Shimizu | 180/142 |
| 4,660,671 | 4/1987 | Behr et al. | 180/142 |

Primary Examiner—John J. Love
Assistant Examiner—Donn McGehan
Attorney, Agent, or Firm—Armstrong, Nikaido, Marmelstein & Kubovcik

[57] ABSTRACT

An electric power steering system (100) for vehicles comprising a drive control circuit (15) for executing a motor drive process (106–111) for feeding an output signal (Va) to an electric motor (11) for supplying auxiliary torque (Ts) to a steering shaft (1,2), in dependence on an output signals (S$_1$–S$_4$) from a sensor (9, 10) for detecting a steering state of the steering shaft, and further a trouble-diagnostic process (113–115) of the system, the drive control circuit including a micro-computer unit (22). The system further comprises a diagnostic proportion changing mechanism (14, 103–105, 112, 116) which is operatively connected to the drive control circuit and changes the proportion of execution of the trouble-diagnostic process to the motor drive process in dependence on the vehicle speed (V). The diagnostic proportion changing mechanism has the execution frequency of the trouble-diagnostic process set so as to be small at a relatively low vehicle speed, increased with increase in vehicle speed, and large at a relatively high vehicle speed.

2 Claims, 10 Drawing Figures

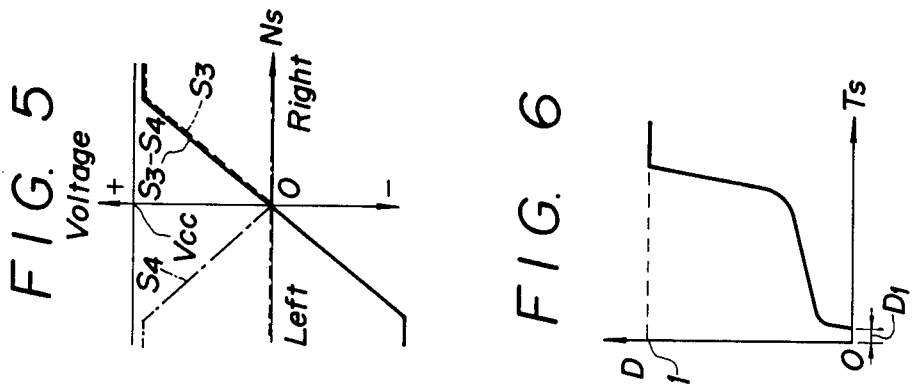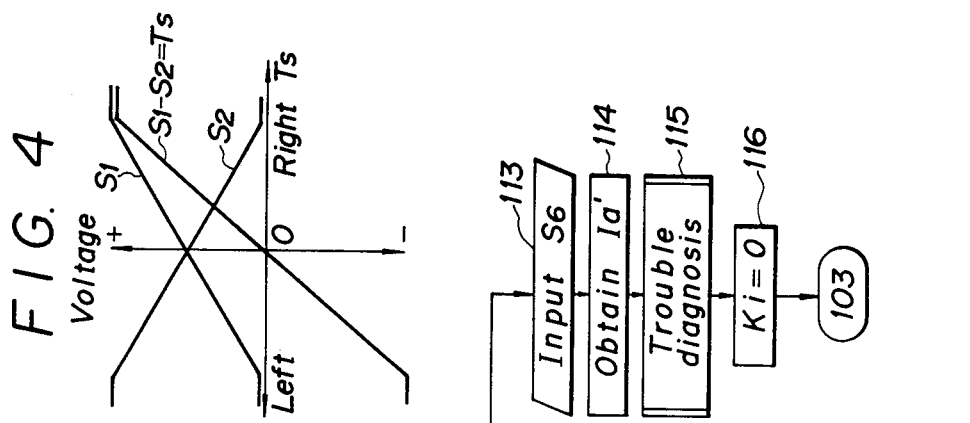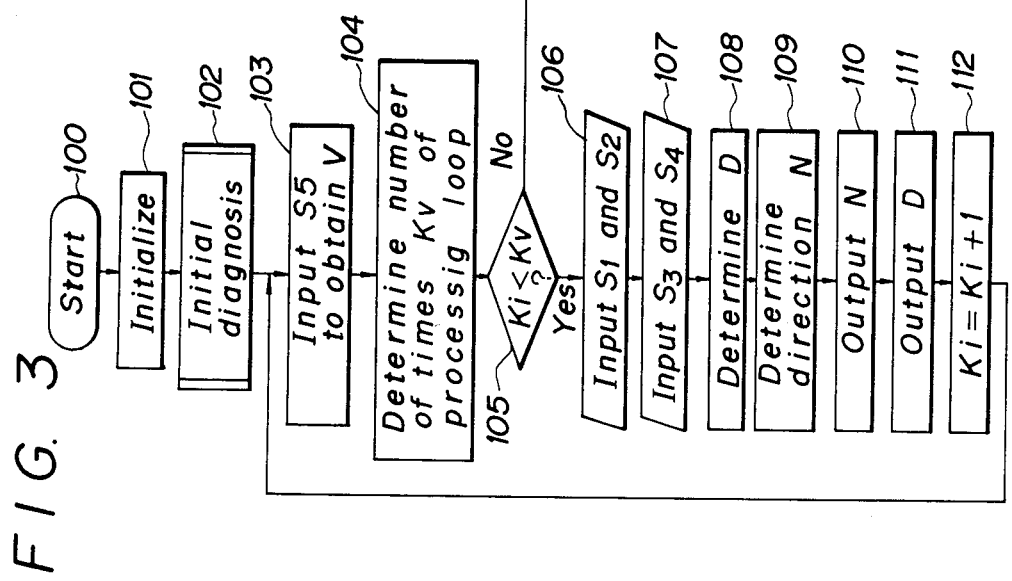

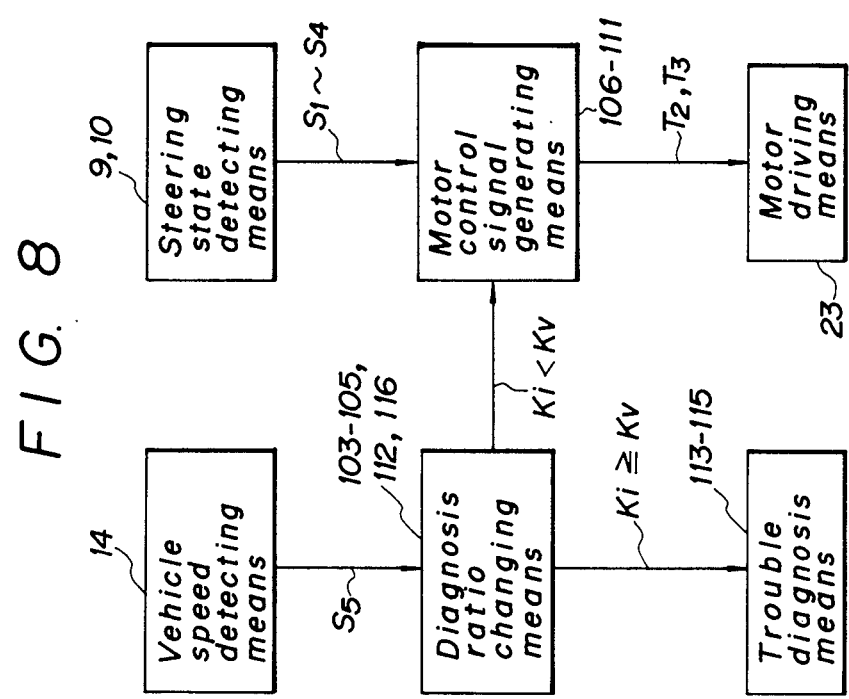
FIG. 8
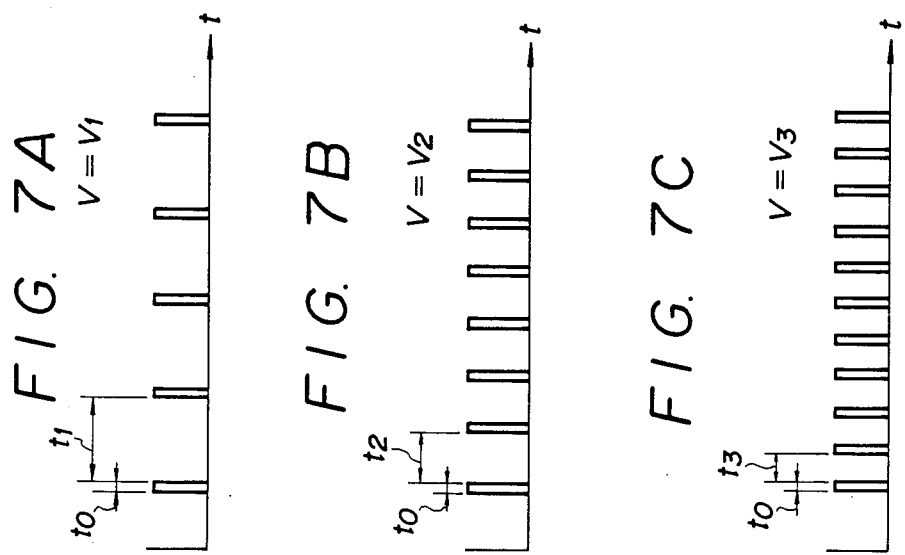
FIG. 7A  V=V₁
FIG. 7B  V=V₂
FIG. 7C  V=V₃

ELECTRIC POWER STEERING SYSTEM FOR VEHICLES

BACKGROUND OF THE INVENTION

1. Field of the Invention

The present invention relates generally to a power steering system for vehicles, and more particularly to an electric power steering system for vehicles which produces auxiliary torque for steering by means of a steering servo unit using an electric motor and which has a function of trouble diagnosis.

2. Description of Relevant Art

Recently, in view of the problems of hydraulic type power steering systems such as the structure thereof is complicated, a variety of electric type power steering systems for vehicls have been proposed.

Exemplarily, in UK Patent Application Publication GBA No. 2132950, published July 18, 1984, there is disclosed an electric power steering system for vehicles of an analogue control type.

This power steering system includes a steering servo unit having an electric motor as its power source, and an analogue control circuit for controlling the servo unit in accordance with a steering torque signal from a detection circuit which detects steering torque acting on a steering wheel. The electric motor produces auxiliary steering torque to thereby reduce the necessary force for steering operation.

In recent years, there is a tendency to utilize microcomputers, which fundamentally are for processing digital signals, as control devices of various working systems, since they have the advantage that complicated control functions can be achieved with a relatively simple system constitution. It is thus desirable to employ a micro-computer as a control device for such a steering system as described, while providing a diagnostic function of various troubles to thereby increase the system reliability.

However, in general, the micro-computer is unable to simultaneously read many input signals, and signal process operations thereof are sequentially performed in accordance with a system clock pulse. Therefore, in the case a variety of trouble diagnoses are left to a microcomputer, there is the possibility that the responsiveness in motor drive control to steering operations may become insufficient. Resulted failure in motor drive control to sufficiently follow a steering operation may give an unfavorable steering feeling. If much importance is attached to the responsiveness to steering operations, the trouble-diagnostic function may be degraded, thus lowering the system reliability.

The present invention has been achieved to effectively solve such problems in electric power steering systems for vehicles of the type in which a micro-computer used as a control device has a trouble-diagnostic function.

SUMMARY OF THE INVENTION

An object of the present invention is to provide an electric power steering system for vehicles which, though employing a micro-computer as its control device, can exhibit a sufficient trouble-diagnostic function, while making a motor drive control following steering operations to a sufficient degree.

To achieve the object, the present invention provides an electric power steering system for vehicles comprising a steering shaft, a means for detecting a steering state of the steering shaft, an electric motor for supplying auxiliary torque to the steering shaft, and a drive control means which receives an output signal from the steering state detecting means and executes a motor drive process for feeding the electric motor with a drive signal in accordance with the output signal and further executes a trouble-diagnostic process of the system, the drive control means including a micro-computer unit, wherein the system further comprises a diagnostic proportion changing means which is operatively connected to the drive control means and changes the proportion of execution of the trouble-diagnostic process to the motor drive process in dependence on the vehicle speed.

The above and further features, objects and advantages of the invention will more fully appear from the following description of an exemplary embodiment when the same is read in conjunction with the accompanying drawings.

BRIEF DESCRIPTION OF THE DRAWINGS

FIG. 3 is a schematic flowchart of control processes to be executed by a micro-computer unit in the control circuit of FIG. 2.

FIG. 4 is a graph describing characteristics of a steering torque detection signal.

FIG. 5 is a graph describing characteristics of a steering speed detection signal.

FIG. 6 is a graph showing the relationship between a duty value of a motor drive signal and steering torque.

FIGS. 7A to 7C are time charts exemplarily showing the relationship between the frequency of trouble diagnosis and vehicle speed.

FIG. 8 is a schematic functional block diagram of the control circuit of FIG. 2.

DETAILED DESCRIPTION OF THE PREFERRED EMBODIMENT

Figure 1:
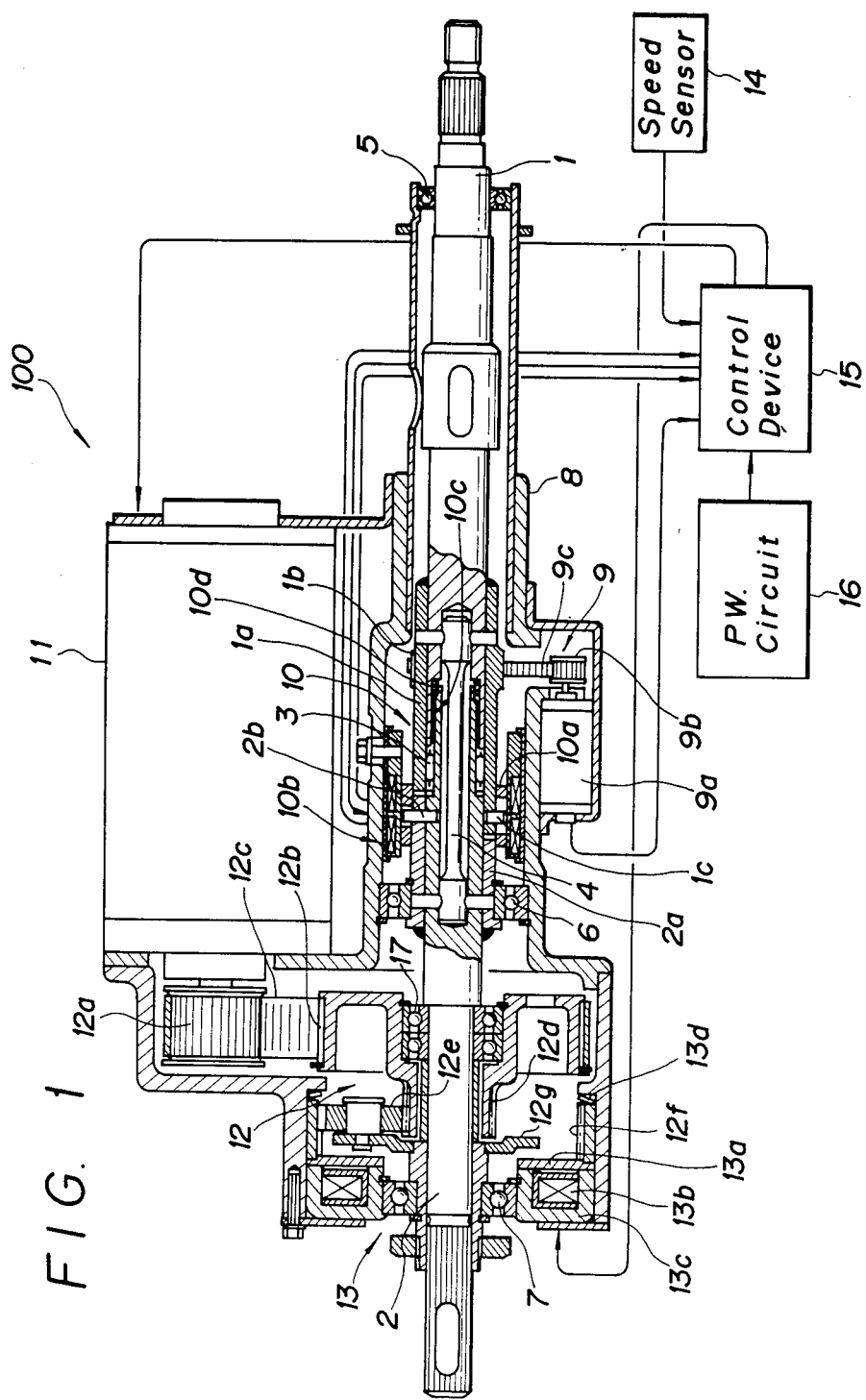
FIG. 1 is a longitudial quarter-cutaway sectional view of an electromagnetic servo unit as an essential part of an electric power steering system for vehicles according to an embodiment of the present invention.

Referring first to FIG. 1, designated at reference numeral 100 is the entirety of an electromagnetic servo unit as an essential part of an electric power steering system according to an embodiment of the present invention, as it is equipped in an unshown vehicle. In FIG. 1, the section shown of servo unit 100 is developed at 90° about the longitudinal axis. The unit 100 includes an input shaft 1 connected to an unshown steering wheel of the vehicle, and an output shaft 2 arranged coaxial with the input shaft 1. The shafts 1, 2 constitute a steering shaft. The output shaft 2 is connected through an unshown universal joint, rack and pinion mechanism, and tie-rod to knuckles which support unshown steered wheels of the vehicle. Shafts 1, 2 are interconnected with each other by a torsion bar 4 centered thereto. The inner end part of input shaft 1 has a hollowed cylindrical member 1a fixedly fitted thereon, and that of output shaft 2 a hollowed cylindrical member 2a fitted thereon. The cylindrical member 1a is bifurcated at the left end thereof, and the cylindrical member 2a at the right end thereof. The bifurcate parts are engaged with each other, with a clearence provided therebetween. Input and output shafts 1, 2 are rotatably supported, through bearings 3, 5, 6, 7, by a casing 8 secured to an unshown column hanger of a body of the vehicle. As the steering wheel is operated, the rotation is transmitted through input shaft 1 and torsion bar 4 to the output shaft 2, whereby the steered wheels are turned. Concurrently, auxiliary torque is supplied from an electric motor 11 to the output shaft 2.

Around the input and output shafts 1, 2 are arranged a steering (rotation) speed sensor 9, a steering torque sensor 10, the auxiliary-torque producing direct-current motor 11, a reduction gearing 12 which transmits torque of the motor 11 to the output shaft 2, and an electromagnetic clutch 13 through which the torque transmission of gearing 12 to shaft 2 is effected. Detection signals of the sensors 9, 10 are input to a control device 15 which is powered from a power circuit 16. To the control device 15, another detection signal is input from a vehicle speed sensor 14. With those signals output from sensors 9, 10, 14, the device 15 functions to control the motor 11 and clutch 13.

The steering speed sensor 9 comprises a direct-current generator 9a integrally fixed to the casing 8, a toothed small-diameter pulley 9b attached to one end of a rotary shaft of the generator 9a, a toothed large-diameter pulley 1b formed on the outer circumference of the cylindrical member 1a, and a timing belt 9c stretched over the pulleys 9b, 1b. The rotation of input shaft 1 is transmitted through the belt 9c to the generator 9a, which generates a direct-current voltage with a polarity corresponding to and a level proportional to the direction and magnitude of a steering rotation speed Ns or angular velocity of shaft 1, respectively.

The steering torque sensor 10 comprises a core member 10a made of a ferrous magnetic substance, the member 10a being axially slidably fitted on the cylindrical members 1a, 2a, and a differential transformer 10b for detecting the axial displacement of the core member 10a, the transformer 10b being fixed to the inner circumference of the casing 8. A pair of pins 1c, 1c are radially outwardly projected from the bifurcate part of the cylindrical member 1a. Likewise, a pair of radially outwardly projecting pins 2b, 2b are provided at the bifurcate part of the cylindrical member 2a. The core member 10a is formed with elongate holes in which the pins 1c, 1c and 2b, 2b are engaged, respectively. The elongate holes engaging with pins 1c, 1c at the end of input shaft 1 are parallel with the axes of input and output shafts 1, 2, while those engaging with pins 2b, 2b at the end of output shaft 2 are inclined at a predetermined angle to these axes. Steering torque Ts acting on the input shaft 1 is transmitted through the torsion bar 4 to the output shaft 2, to rotate the shaft 2 against a load imposed thereon. If the load at the output side is superior to the transmitted steering torque Ts, the torsion bar 4 twists, developing a circumferential relative angular difference between the input and output shafts 1, 2. Concurrently, the core member 10a engaged with pins 1c, 2b is caused to move in either sense of the axial direction in correspondence to the acting direction of steering torque Ts. The axial displacement of core member 10a corresponds to the magnitude of acting steering torque Ts. The differential transformer 10b has a primary winding to which an alternating voltage is applied from the control device 15, and secondary windings from which output voltages are fed to the device 15. The amplitudes of the secondary voltages differentially change in dependence on the axial displacement of the core member 10a. In this respect, the core member 10a is so arranged as to take a middle position, as shown in FIG. 1, when no relative angular difference is developed between the input and output shafts 1, 2 without steering torque acting on the input shaft 1. An elastic ring 10d with an appreciable coefficient of friction is interposed between the inner end part of input shaft 1 which is hollowed and a reduced axial projection of the inner end part of output shaft 2. The ring 10d functions to produce counter torque in proportion to the difference between angular velocities of the input and output shafts 1, 2, thus controlling fluctuations in phase difference between the shafts 1, 2, resulting in an increased output stability of the steering torque sensor 10. In other words, the ring 10d cooperate with the inner end of input shaft 1 and the reduced inner end projection of output shaft 2 to constitute a torque damping mechanism 10c. The output voltages of the differential transformer 10b with such constitution successfully represent the direction and magnitude of steering torque Ts.

A later-described steering state detecting means of FIG. 8 consists of the steering speed sensor 9 and the steering torque sensor 10.

The rotary shaft of the electric motor 11 has a toothed small-diameter pulley 12a fixed thereon. The pulley 12a is interconnected through a timing belt 12c with a toothed large-diameter pulley 12b which is rotatably mounted on the output shaft 2 by use of a bearing 17. The rotation of motor 11 is thus transmitted to the large-diameter pulley 12b, with a reduced speed. The pulley 12b has a sun gear 12d formed in a left portion thereof, and a ring gear 12f is rotatably fitted in the casing 8. Three planet gears 12e meshing with both of the sun and ring gears 12d, 12f are rotatably supported on a carrier plate 12g which is fixed on the output shaft 2. The pulleys 12a, 12b, timing belt 12c, and gears 12d, 12e, 12f constitute the reduction gearing 12.

The electromagnetic clutch 13 comprises a clutch plate 13a secured to the left end of the ring gear 12f, a field member 13c with a channel-like section for accommodating therein an exciting coil 13b, and a plate spring 13d interposed between the right end of the ring gear 12f and a flanged portion of the casing 8. The spring 13d resiliently biases the clutch plate 13a as well as the ring gear 12f toward an opening of the field member 13c. When the coil 13b is energized, the ring gear 12f is bound to the casing 8 with magnetic flux passing the field member 13c and clutch plate 13a. Such condition permits the reduction gearing 12 to function so that the rotation of the motor 11 is reduced to be transmitted to the output shaft 2.

The vehicle speed sensor 14 includes an unshown speedometer cable connected to an unshown magnet which rotates together with the cable. With rotation of the magnet, an unshown reed switch turns on and off to produce a pulse signal, which is fed to an unshown frequency-to-voltage converter, where it is converted into a direct-current voltage which is output as a vehicle speed signal.

The control device 15 will be described below, with reference to FIG. 2.

The control device 15 comprises a micro-computer unit 22 (hereinafter called MCU), a motor drive circuit 23, a clutch drive circuit 24, and a current detecting circuit 25. Also sensors 9, 10, 14 and power circuit 16 may be included as in FIG. 2. The MCU 22 receives a pair of detection signals $S_1$, $S_2$ from steering torque sensor 10, a pair of detection signals $S_3$, $S_4$ from steering speed sensor 9, a detection signal $S_5$ from vehicle speed sensor 14, and a detection signal $S_6$ from current detecting circuit 25. The detection signals $S_1$ to $S_4$ and $S_6$ are input to MCU 22 through an analogue to digital converter 21, following a command from the MCU 22. The detection signal $S_5$ is the vehicle speed signal and directly input to MCU 22.

The steering torque sensor 10 includes an unshown interface device which receives an internal clock pulse of MCU 22 and, after dividing same at a number of stages to obtain an alternating-current signal, feed it to the primary winding of differential transformer 10b. On the other hand, the output voltages from the secondary windings of the transformer 10b are input to the interface device, where they are rectified smooth to obtain direct-current voltages which are output as steering torque detection signals, i.e., the signals $S_1$, $S_2$.

The steering speed sensor 9 also includes an unshown interface device, which receives a pair of potential difference signals from output terminals of direct-current generator 9a and eliminates their high-frequency components to obtain smooth voltage signals which are output as steering speed detection signals, i.e., the signals $S_3$, $S_4$ The MCU 22 includes necessary unshown devices such as an input/output port, RAM and ROM memories, a programmable timer, and a clock generator connected to a quartz oscillator.

The power circuit 16 applies necessary power to other circuits including MCU 22. It comprises a normally-closed relay 32 connected through an ignition switch 31 to a positive terminal of a battery 30 of the vehicle, and a voltage stabilizer 33 connected to the relay 32. The relay 32 has an output terminal 32a for applying power to motor drive circuit 23, and the stabilizer 33 an output terminal 33a for supplying a constant voltage to MCU 22, sensors 9, 10, 14, and other circuitries. While ignition switch 31 is turned on, MCU 22 is put in an energized state, where detection signals $S_1$ to $S_5$ from sensors 9, 10, 14 are processed, following a program written in the memories. Then, a pair of drive control signals $T_2$, $T_3$ are output from MCU 22 to motor drive circuit 23, where they are used for driving motor 11. The signal $T_2$ is for controlling the direction of rotation of motor 11, and $T_3$ for controlling motor torque by changing an armature voltage Va.

The motor drive circuit 23 comprises a drive unit receiving the control signals $T_2$, 3, and a bridge circuit 40 consisting of four field effect transistors 41, 42, 43, 44 (hereinafter called FET). In the bridge circuit 40, FET's 41, 44 on a pair of neighboring bridge sides have drain terminals thereof both connected to the output terminal 32a of relay 32, and source terminals thereof connected to drain terminals of the remaining FET's 42, 43 respectively. The FET's 42, 43 constitute the other pair of neighboring bridge sides and have source terminals thereof both connected through a resistor 45 to the ground as a common side to which the battery 30 also is connected at the negative side. Gate terminals of FET's 41, 42, 43, 44 are connected to output terminals 35a, 35d, 35b, 35c of drive unit 35, respectively. Source terminals of FET's 41, 44 serve as output terminals of bridge circuit 40, and are connected to input terminals of motor 11.

The drive unit 35 functions, depending on the motor rotation direction responsible control signal $T_2$ and motor torque magnitude responsible control signal $T_3$ from MCU 22, such that, in dependence on the control signal $T_2$, an on-off signal $Q_1$ or an on-off signal $Q_3$ is output from the terminal 35a or 35c to thereby exclusively turn on FET 41 or 44, respectively, and at the same time a PWM signal $Q_2$ or a PWM signal $Q_4$ is output from the terminal 35b or 35d to thereby exclusively bring FET 43 or 42 into its drivable state, respectively. The signals $Q_2$, $Q_4$ are given in the form of a series of PWM (pulse duration modulation) waves obtained by modulating the duration of a rectangular battery-level pulse signal of a constant frequency, depending on the control signal $T_3$. As a result, the motor 11 is driven with an armature voltage Va having a polarity and a magnitude corresponding to the signals $T_2$, $T_3$, respectively.

In other words, the motor drive circuit 23 drives the motor 11, depending on the control signals $T_2$, $T_3$ from MCU 22, in such a manner that the direction of rotation and output power (the number of revolutions and torque) of motor 11 are controlled by either a cooperative combination of FET 41 as turned on and FET 43 as PWM-driven or a cooperative combination of FET 44 as turned on and FET 42 as PWM-driven.

In the case motor 11 is controlled by the combination of FET's 41, 43, the magnitude of armature voltage Va is proportional to the pulse duration of PWM signal $Q_2$ output from terminal 35b of drive unit 35 and the polarity of the voltage Va is such that an armature current Ia runs in either direction to cause the motor 11 to rotate clockwise. On the other hand, in the case of the combination of FET's 42, 44, the magnitude of voltage Va is proportional to the pulse duration of PWM signal $Q_4$ from terminal 35d and the polarity thereof is such that an armature current Ia runs in the opposite direction, causing the motor 11 to rotate counterclockwise.

The clutch drive circuit 24 comprises a drive unit which controls the electromagnetic clutch 13 in an on-off manner in dependence on a control signal $T_4$ sent from MCU 22.

The current detecting circuit 25 is for detecting abnormalities in relation to motor drive circuit 23. It comprises an unshown low-pass filter for obtaining a direct-current voltage from a potential difference across the resistor 45, and an unshown amplifier for amplifying the voltage output from the low-pass filter. The circuit 25 detects an abnormal current conducted through resistor 45, to thereby give information on troubles at the motor drive circuit 23 and motor 11. If any trouble is found on the basis of detection signal $S_6$ from circuit 25, the MCU 22 outputs a control signal $T_1$ to the relay 32 of power circuit 16. The signal $T_1$ opens relay 32, interrupting power supply from circuit 26 to other circuitries.

There will be described below various programmed functions of MCU 22.

FIG. 3 is a flow chart schematically showing various control processes in MCU 22. Reference numerals 100 to 116 represent process steps.

By turning on ignition switch 31, MCU 22 as well as other associated circuits have electric power applied thereto and are permitted to exhibit control functions thereof.

First, at step 101, respective registers, factors and parameters, data in RAM, and circuits in MCU 22 are initialized, as required.

Then, at step 102, the detection signal $S_6$ from current detecting circuit 25 is read, and a diagnosis is made whether or not the motor 11 and drive circuit 23 have a trouble, by checking for abnormalities of current. Next, the detection signals $S_1$ to $S_5$ from sensors 9, 10, 14 are read in order and checked for abnormalities of signal value, to thereby diagnose whether associated circuits are troubled or not. Further, testing data may be output to various circuitries, to thereby diagnose whether associated elements function or not. By such diagnoses, troubles are initially checked for. If any trouble is judged to be present, the control signal $T_1$ is output to relay 32. Then, the relay 32 opens, and MCU 22 stops working. As a result, also the function of control device 15 stops. If no trouble is found, the flow goes to step 103.

At the step 103, the detection signal $S_5$ from vehicle speed sensor 14 is read to obtain a vehicle speed V. Next, at step 104, with respect to thus obtained vehicle speed V, there is determined a reference frequency or number of cycles or times Kv by which the process loop should be experienced. The number of times Kv is an integer and preset to be written in advance in a table in a memory of MCU 22, such that it decreases as the vehicle speed V increases.

Then, at decision step 105, a judgment is made whether or not the content of a counter counting a number of times Ki by which the process loop has been cycled till then represents a smaller integer than the number of times Kv. The current number of times Ki has been initialized to zero at the step 101, whereas it will be reset to zero at step 116 as well. If it is concluded at the step 105 that Ki is smaller than Kv, the flow goes to step 106.

At the step 106, the steering torque detection signals $S_1$, $S_2$ are read. If the steering torque sensor 10 including differential transformer 10b is normal, the detection signals $S_1$, $S_2$ have such relations to steering torque Ts as shown in FIG. 4. Half of the sum of signals $S_1$ and $S_2$ substantially equals to a constant value k. The phase difference between input and output shafts 1, 2 is restricted within a predetermined angle by the engagement between the bifurcate part of the cylindrical member 1a and that of the cylindrical member 2a. Thus, the values of signals $S_1$, $S_2$ are kept constant while steering torque Ts is larger in magnitude than a predetermined value, in each acting direction thereof. At the step 106, a calculation is made such that $S_1-S_2$, letting the result be a value of steering torque Ts. Moreover, in order to judge the acting direction of steering torque Ts, a determination of whether the value of Ts is positive or negative is made. If torque Ts acts clockwise, i.e., if the value is positive or zero, an unshown steering direction flag is set to "1". In the case the value of Ts is negative, its absolute value is taken by excuting a process such that $Ts = -Ts$, and the steering direction flag is reset to "0".

Next, at step 107, the detection signals $S_3$, $S_4$ from steering speed sensor 9 are read. If the steering speed sensor 9 is normal, the detection signals $S_3$, $S_4$ have such relations to steering speed Ns as shown in FIG. 5. The sensor 9 is normal, when the direct-current voltage values of both signals $S_3$, $S_4$ are concurrently positive, and when either of signals $S_3$, $S_4$ stands out of the vicinity of the output voltage Vcc of stabilizer 33. In this respect, the generator 9a has such a characteristic that the maximum output voltage thereof as expected is lower than Vcc by a predetermined value. Moreover, at the step 107, a calculation is made such that $S_3-S_4$, letting the result be a value of steering speed Ns.

At step 108, the content of an unshown table in ROM is directly read in an address designation manner in dependence on the absolute value of steering torque Ts. The table is written in ROM in advance, and there are stored duty values D having such a relation to the absolute value of steering torque Ts as shown in FIG. 6. $D_1$ is a dead zone.

Next, at step 109, the direction N of rotation of motor 11 is determined, depending on the content of the steering direction flag as set at the step 106.

Then, at step 110, the determined direction N is output, and at step 111, the read duty value D. At step 112, the current number of times Ki is incremented by unity. Thereafter, the flow goes to step 103.

The steps 106 to 112 constitute a routine for motor drive control.

More particularly, the following processes are performed at the steps 110 to 111.

In the case the steering direction flag is "1", i.e., steering torque Ts acts clockwise, the drive signals $Q_1$, $Q_2$, $Q_3$, $Q_4$ are set such that:

$Q_3$="0", $Q_1$="1",
$Q_2$="1", $Q_4$="0".

On the other hand, if the direction flag is "0", i.e., steering torque Ts acts counterclockwise, the signals $Q_1$ to $Q_4$ are set such that:

$Q_3$="1", $Q_1$="0",
$Q_2$="0", $Q_4$="1".

Then, the content of thus set signals $Q_1$ to $Q_4$ and the duty value D are output to drive unit 35. The duty value D represents the proportion of pulse duration of PWM signal $Q_2$ or $Q_4$. More particularly, the duty value D is modified so as to have a matching motor rotation speed Nm to the steering speed Ns detected at the step 107. Such a process gives the motor control signal $T_2$, $T_3$. In such a manner, the motor 11 is rotated in either direction, and output torque thereof is transmitted in a speed reducing manner to the output shaft 2, to thereby lighten the necessary steering force. When motor 11 is driven, the control signal $T_4$ is sent to the drive circuit 24 to operate the electromagnetic clutch 13.

The cycle including drive control processes between steps 106 to 112 is repeated till the current number of times Ki reaches the number of times Kv determined from vehicle speed V at step 103.

If it is decided at the decision step 105 that Ki is not smaller than Kv or that Ki is equal to or larger than Kv, the flow goes to step 113. The necessary time for the program to execute steps 103 to 112 or steps 103 to 105 and 113 to 116 is very short. However, the vehicle speed Vi encountered when the flow passes steps 103 to 105 in a certain cycle thereof may be changed when it passes same in the next cycle. The value of Kv is directly determined from vehicle speed V at step 104, and is changed as the vehicle speed V changes. Therefore, in a certain case, Ki may be larger than Kv.

At the step 113, the detection signal $S_6$ from current detecting circuit 25 is read.

Next, at step 114, an operation is made to determine the armature current Ia of motor 11 in dependence on the read signal $S_6$. Namely, a current value represented by the signal $S_6$ is divided by output duty value D to obtain a reduced armature current Ia'.

Then, at step 115, a judgment whether or not the reduced armature current Ia' is smaller than a predetermined value is made with a predetermined permissible range of difference. If it is judged not to be so, the program decides a trouble should be present, and outputs the control signal $T_1$ to relay 32. The relay 32 closes and, threafter, MCU 22 stops working, so that the function of control device 15 also stops.

In the case no trouble is judged to be present at the step 115, the flow goes to step 116, where the current number of times Ki is substituted with zero. Thereafter, the flow goes to step 103.

In the foregoing embodiment, a proportion of execution ($=1/K_v$) of a trouble-diagnostic routine including steps 113 to 116 to a motor drive control routine including steps 106 to 112 is determined in dependence on the vehicle speed V. The number of times $K_v$ of execution of the process loop decreases with increase in vehicle speed V. Accordingly, for three different vehicle speeds $V_1$, $V_2$, $V_3$ ($V_1<V_2<V_3$), the frequency of execution of the trouble-diagnostic routine changes as shown by FIGS. 7A to 7C. In these Figures, $t_0$ is the execution time of the trouble diagnostic routine, and substantially constant. $t_1$, $t_2$, $t_3$ are continuous execution times of the motor drive control routine for the vehicle speeds $V_1$, $V_2$, $V_3$, respectively, and changed such that $t_1>t_2>t_3$. Namely, the frequency of trouble diagnosis increases with increase of vehicle speed V.

Figure 2:
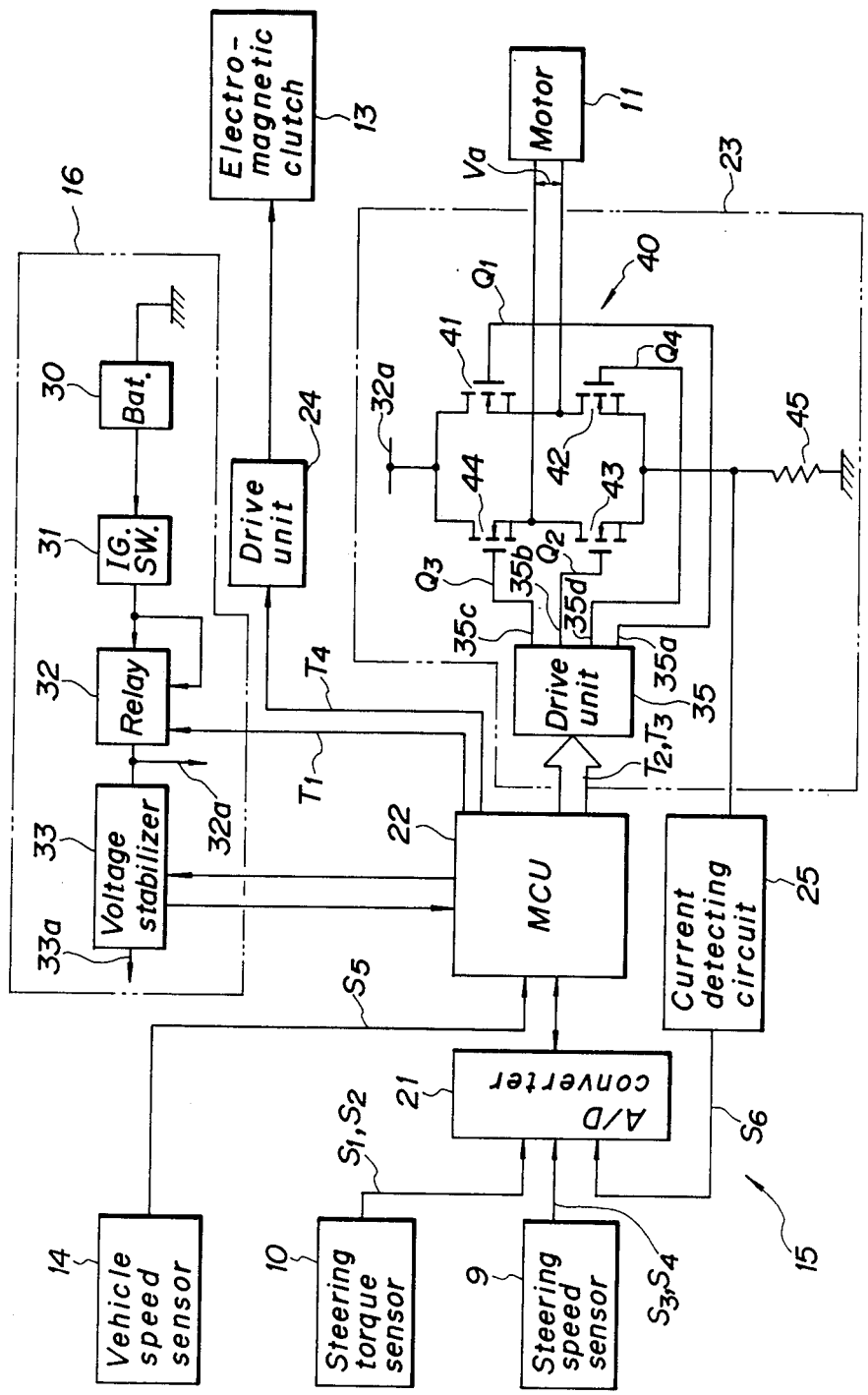
FIG. 2 is a block diagram of a control circuit of the electromagnetic servo unit.

FIG. 8 is a schematic block diagram describing various functions of control device 15, showing interrelations between the device 15 of FIG. 2 and principal steps of the program flow of FIG. 3. The control signals $T_1$, $T_4$ are omitted.

According to the embodiment described, in the electric power steering system 100 for vehicles of which the control device 22 includes MCU 22, the proportion of execution ($1/K_v$) of a trouble-diagnostic process to a motor drive control process changes in dependence on the vehicle speed V, so that a motor drive control is performed following the steering operation to a sufficient degree, while permitting a trouble self-diagnostic function to be successfully exhibited. As a result, a favorable steering feeling is achieved.

The frequency of execution of the trouble-diagnostic process is small at relatively low vehicle speeds, while it increases with increase of vehicle speed V, and becomes large at relatively high vehicle speeds. Therefore, the control of motor has a priority to trouble diagnoses in a low-speed state where the steering operation is frequently performed with a relatively large angle. On the other hand, much importance is attached to the trouble diagnosis in a high-speed state where the steering operation is less frequent and performed with a relatively small angle. As a result, over a range from a low vehicle speed to a high vehicle speed, the driving of motor is controled with a favorable responsiveness to the steering operation, without degrading the trouble diagnostic function.

In the embodiment above, the execution time $t_0$ of the trouble-diagnostic process is substantially kept constant, and the execution frequency is increased with increase of vehicle speed V. In this respect, the execution frequency may be kept constant, while permitting the time of trouble diagnosis to be extended with increase of vehicle speed V. Moreover, instead of a substantially continuous change in the embodiment, the proportion of execution of a trouble diagnostic process to a motor drive control process may be changed stepwise.

Incidentally, the content of trouble-diagnostic processes at the steps 113 to 115 is illustrative and not restrictive.

Although there has been described what is at present considered to be the preferred embodiment of the invention, it will be understood that the present invention may be embodied in other specific forms without departing from essential characteristics thereof. The present invention is therefore to be considered in all respects as illustrative but not restrictive. The scope of the invention is indicated by the appended claims rather than by the foregoing description.

I claim:

1. An electric power steering system for vehicles comprising a steering shaft, means for detecting a steering state of said steering shaft, an electric motor for supplying auxiliary torque to said steering shaft, and drive control means which receives an output signal from said steering state detecting means and executes a motor drive process for feeding said electric motor with a drive signal in accordance with said output signal and further executes a trouble-diagnostic process of said system, said drive control means including a microcomputer unit, wherein:

said system further comprises diagnostic proportion changing means which is operatively connected to said drive control means and changes the proportion of execution of said trouble-diagnostic process to said motor drive process in dependence on the vehicle speed.

2. An electric power steering system according to claim 1, wherein:

said diagnostic proportion changing means has the execution frequency of said trouble-diagnostic process set so as to be small at a relatively low vehicle speed, increased with increase in vehicle speed, and large at a relatively high vehicle speed.

* * * * *